Oct. 7, 1969    M. L. POLANYI    3,471,214
ELONGATED FLEXIBLE FIBER OPTICAL SHEET-LIKE LAYER
AND ASSOCIATED OPTICAL COMPONENTS FOR
TRANSMITTING TWO-DIMENSIONAL IMAGES
Filed Feb. 21, 1966
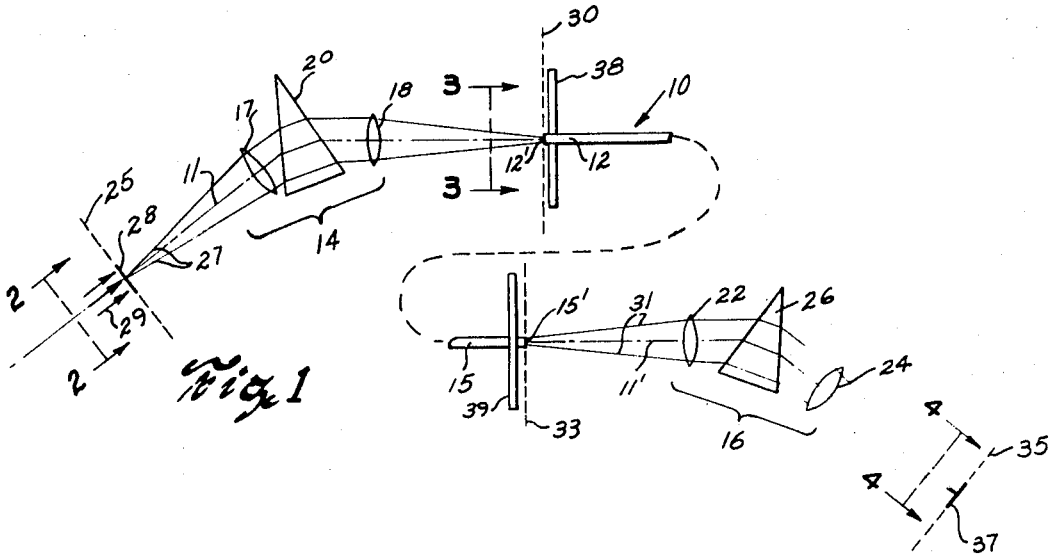
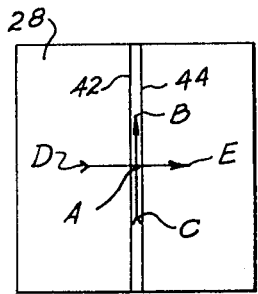
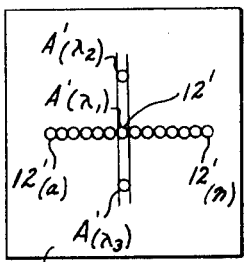
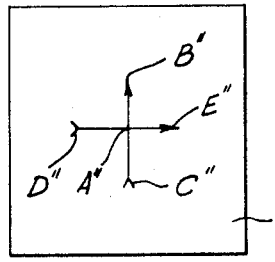
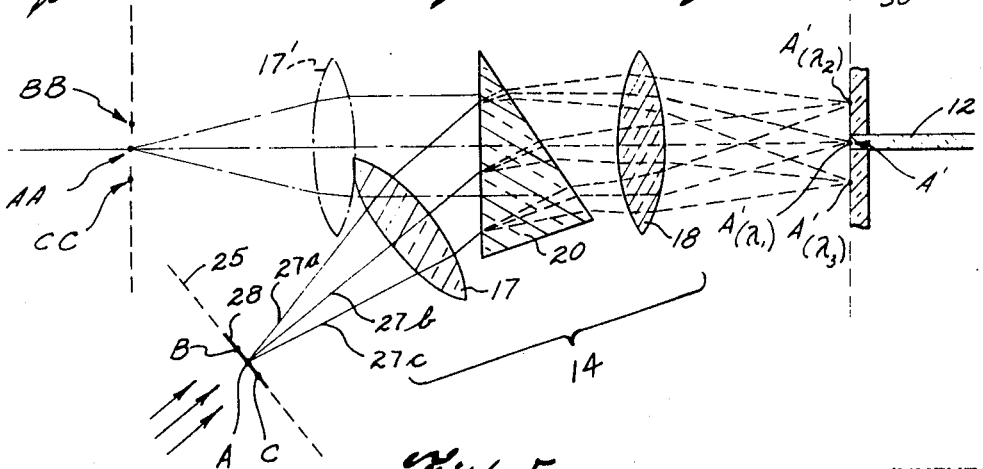
INVENTOR.
MICHAEL L. POLANYI
BY Noble J. Williams
ATTORNEY United States Patent Office

3,471,214
Patented Oct. 7, 1969

3,471,214
ELONGATED FLEXIBLE FIBER OPTICAL SHEET-LIKE LAYER AND ASSOCIATED OPTICAL COMPONENTS FOR TRANSMITTING TWO-DIMENSIONAL IMAGES
Michael L. Polanyi, Webster, Mass., assignor, by mesne assignments, to Warner-Lambert Pharmaceutical Company, Morris Plains, N.J., a corporation of Delaware
Filed Feb. 21, 1966, Ser. No. 529,040
Int. Cl. G02b 5/14; G02f 5/00
U.S. Cl. 350—96     1 Claim

ABSTRACT OF THE DISCLOSURE

Apparatus for transmitting a two-dimensional optical image from one location to another using an elongated flexible sheet-like array of fiber optical components in combination with light-dispersing and image-forming means at opposite ends thereof.

---

This invention relates broadly to optical devices, optical systems, and the like constructed and arranged to transmit two-dimensional images from one location to another. More particularly, the invention relates to optical image-transmitting devices, systems, and the like of improved construction and optical design employing as an essential part of said system a special assembly of fiber optical components in sheet-like form, or the optical equivalent thereof, and in such a manner as to enable two-dimensional images of good optical quality and good resolution to be transmitted from one location to another thereby. Thus, an improved optical image-transmitting system of less size, less weight, and less cost than has been possible heretofore may be effected.

More specifically, the improved image-transmitting system employs a fiber optical assembly, or the like, of special form, and adjacent an entrance end and also adjacent an exit end thereof, two generally similar light-relaying systems, each including image-forming and light-dispersing means, are arranged in optical alignment with the opposite ends of said assembly, and with said assembly comprising a relatively large number of similar thin elongated light-conducting components having their respective opposite end portions, at least, arranged in proper geometric array relative to each other and in proper alignment with and in proper orientation relative to said light-relaying systems.

In certain instances, particularly wherein space and weight may be material considerations in an optical system or the like, the transmission of a two-dimensional optical image from one location to another by means of a single row or single layer of many fiber optical components, rather than by the use of a conventional square bundle formed by the same number of such components squared may be of a real advantage. Thus, for example, if a fiberscope, or the like, were to employ as heretofore, a square bundle of thin elongated light-conducting fibers of like predetermined cross-sectional size and arrangement at its entrance and exit ends for the transmission of an optical image and comprised say one thousand fibers in each direction (or a total of one million fibers in all) to transport a two-dimensional optical image from one location to another, and if, by the use of the present invention, it is possible to employ instead a single flat layer of one thousand such fibers to transport the image with satisfactory results, a material reduction in size, weight and cost of the fiberscope would be produced.

It is, accordingly, an object of the present invention to provide an optical system, or the like, comprising a fiber optical assembly comprising a plurality of thin elongated light-conducting components, arranged, at least adjacent their oppoiste end portions, in side-by-side parallel relation to each other and in flat sheet-like form and in like geometric array, and a pair of similar light-relaying systems including image-forming and light-dispersing means arranged in aligned relation therewith and in proper orientation relative to the entrance and exit ends of the assembly, respectively, whereby two-dimensional images may be transmitted thereby.

It should be appreciated, of course, that the assembly of like light-conducting components forming such a sheet-like layer as mentioned above, may be of any reasonable length desired and that the cross-sectional size of said light-conducting components (which in usual fashion comprise solid light-transmitting cores such as glass or plastic and of predetermined refractive index surrounded by solid transparent claddings of glass or plastic and of lower refractive index) may be of any value needed within a relatively wide range of sizes, but would be, of course, in keeping with the particular use to which said image-transmitting optical system is to be put and whether or not a relatively rigid or fairly flexible assembly is desired.

Other objects and advantages of the invention will become apparent from the detailed description which follows when taken in conjunction with the accompanying drawings in which:

FIG. 1 is a diagrammatic showing of structure embodying the present invention;

FIG. 2 is an enlarged sectional view taken substantially upon section line 2—2 of FIG. 1 and looking in the direction of the arrows;

FIG. 3 is an enlarged sectional view taken substantially upon section line 3—3 of FIG. 1 and looking in the direction of the arrows;

FIG. 4 is an enlarged sectional view taken substantially upon section line 4—4 of FIG. 1 and looking in the direction of the arrows; and FIG. 5 is a longitudinal sectional view showing, materially enlarged, a portion of the structure of FIG. 1, in order to better explain principles of operation of the invention.

Referring to the drawing in detail and in particular FIG. 1 wherein an optical system for transmitting two-dimensional images is diagrammatically shown, it will be appreciated that a fiber optical assembly is indicated generally by the numeral 10 and that this assembly is disposed in the optical system so as to have its entrance end portion 12 arranged in optical alignment with a first light-relaying system 14 and its exit end portion 15 arranged in optical alignment with a second substantially similar light-relaying system 16. The fiber optical assembly 10, which is of special construction and which will be more fully described hereinafter, is not only aligned with but also oriented relative to the light received from relay system 14 and also relative to the relay system 16.

The relay system 14, it will be noted, comprises in alignment along optical axis 11 first lens means 17 and second lens means 18, and with dispersion prisms means 20 disposed therebetween. In like manner, relay system 16 comprises in alignment along optical axis 11' first lens means 22 and second lens means 24, and has dispersion prism means 26 disposed therebetween. Thus, relay system 14, as indicated by light rays 27 in FIG. 1, is positioned and arranged so as to focus upon an object plane 25 and to form, in a general sense, an image of an object, such as object 28, at this location when illuminated by light rays 29 at image plane 30. Image plane 30 is, in fact, coincident with the entrance end of assembly 10. In like manner, relay system 16, as indicated by light rays 31, is positioned and arranged so as to focus upon an object plane 33 coincident with the exit end of the assembly 10 and to form, in a general sense, an image of the light received therefrom at a conjugate image plane 35. A viewing screen 37, or the like, may be disposed at image plane 35 for receiving and displaying such images. Also opaque plates 38 and 39 are shown for supporting the opposite ends of assembly 10 in proper positions.

FIGURES 2, 3 and 4 are enlarged sectional views taken upon section line 2—2, section line 3—3, and section line 4—4, respectively, in FIG. 1. FIG. 2 shows an illuminated target in the form of a transparent film 28 having two arrows BAC and DAE in crossed relation as a contrasting pattern thereon, the two-dimensional image of which is to be transmitted by the improved optical system of the present invention from object plane 25 to image plane 35.

FIG. 3 shows supporting plate 38 and an end view of the assembly 10 carired thereby. Thus, it will be seen that assembly 10 comprises, at least adjacent its entrance end, a relatively large number of thin elongated light-conducting components $12'(a)$, $12'$, and $12'(n)$ of conventional kind which are arranged in side-by-side generally parallel relation to one another so as to form a single sheet-like layer. These light-conducting components at their exit end portions 15 would also be similarly disposed and arranged in like geometric array. However, intermediate their opposite ends, the light-conducting components may or may not be so arranged; particularly if flexibility in assembly 10 is desirable.

FIG. 4 is intended to show a two-dimensional image of the pattern BAC and DAE as transmitted by the improved optical system to the image plane 35 and as received upon viewing screen 37 at this location.

In order to better describe the principles of operation of the invention, FIG. 5 shows, in longitudinal section and appreciably enlarged, the forward portion of the image-transmitting optical system of FIG. 1. If, for the moment, the relay system 14 is considered and it is imagined that prism means 20 has been omitted therefrom, it will be appreciated that under such conditions, lens means 17 would be placed in the dotted-line position $17'$ and at that time lens means 17 and 18 together would image axial object point AA at axial image point $A'$. Note that the light rays travelling between these two lens means is "parallel light," and that this image would be formed upon the entrance end face of light-conducting component $12'$ (FIG. 3). It follows, of course, that off-axis points BB and CC would likewise form images at image plane 30 and at points below and above image point $A'$ respectively.

In FIGURE 5, however, when prism means 20 is present in the relay system also comprising means 17 and 18, not only will light rays from a polychromatically illuminated object point A in the object plane 25 be imaged by said lens means at image plane 30 but, furthermore, the light rays of different wavelengths will be differently refracted and dispersed by prism means 20 at said image plane. Thus, instead of a single image of point A being formed at image point $A'$, an image of point A in each different color or wavelength of the polychromatic illumination will be formed at image plane 30 and these different colored images will be laterally displaced relative to one another at image plane 30 in accordance with the refractive and dispersive characteristics of the prism means 20.

Accordingly, it follows that if object point A is, for example, illuminated by white light, this white light will be directed by lens means 17 as parallel light toward prism means 20 and will be dispersed thereby into its component colors or wavelengths. Thereafter, the light of each different wavelength will be focused by lens means 18 at a slightly different location at image plane 30. Thus, the yellow light of a wavelength ($\lambda_1$), for instance, may be so deviated by prism means 20 and imaged by lens means 18 as to form a yellow image of A substantially at image point $A'(\lambda_1)$. However, at the same time, the red component of this white light from point A and at a wavelength ($\lambda_2$) may be so deviated by the prism means 20 and imaged by lens means 18, as indicated by dotted lines, as to form a red image of A at image point $A'(\lambda_2)$. Likewise, the blue component of this white light from object point A and of a wavelength ($\lambda_3$) may be so deviated by prism means 20 and imaged by lens means 18, as indicated by dotted lines, as to form a blue image of point A at image poine $A'(\lambda_3)$.

It will immediately be appreciated that, due to the prism means 20 in the path of the substantially parallel light rays coming from object point A, all of the images of A being formed in the various different component wavelengths will be dispersed but will overlap one another and thus will appear as a spectrum at image plane 30.

Even though only a narrow band of wavelengths ($\lambda_1$) of yellow light from point A will enter the light-conducting component 12 and the other wavelengths, such as $A'(\lambda_2)$ above and $A'(\lambda_3)$ below will be unused, nevertheless, it follows that other illuminated object points in the same vertical plane in FIG. 2, and plane of the drawing in FIG. 5, such as points B and C will be, at the same time, contributing illumination to the relay system 14 and in such a manner as to have each point not only imaged at the image plane 30 but also dispersed by the prism means 20 into a spectrum of image points of different wavelengths. Of course, each of these spectrums will be vertically offset relative to the spectrum formed by light from point A. The result will be, however, that only light of a narrow band of wavelengths from point B and a different narrow band from point C will impinge upon the entrance end of the light-conducting component 12 and will be thereafter conducted thereby.

If reference is now again made to FIG. 2, it will be seen that, for discussion, two closely spaced vertically extending reference lines 42 and 44 are shown. Note that FIG. 5 is a longitudinal sectional view which lies substantially between these two lines. For the discussion which follows, it will be convenient to consider that the spacing between these two lines 42 and 44 has been chosen so as to just equal the transverse dimension of the image of the end face of a single light-conducting component of the assembly 10, such as $12'$ of FIG. 3, when projected back through the relay system 14 to object plane 25 and onto object 28. Thus, note, for each vertically displaced object point B, A, C, etc. (within the narrow strip indicated between parallel lines 42 and 44) only a small part of the spectral image thereof will impinge upon and will be transmitted by the light-conducting component 12. Nevertheless, component 12 will be simultaneously transmitting light from each different point of the narrow vertical strip, such as from the arrow, BAC in FIG. 2, and this will be so notwithstanding the fact that each point will be contributing light of a different wavelength band.

However, the object pattern at 28 in FIG. 2, is two-dimensional and contains also horizontally-extending arrow DAE. Since the assembly 10 comprises many small light-conducting components arranged in a sheet-like or layer-like form at its entrance end 12, as indicated in FIG. 3, it should be readily appreciated that each individual one of these light-conducting components $12'(a)$, $12'$, $12'(n)$ may be thought of in a like manner but with each lying in a different longitudinally-extending vertical plane through the relay system 14. Thus, each individual component will, in a similar manner, conduct light received from a correspondingly laterally offset vertically extending strip or portion of object field 28. Thus, when all of the light-conducting components together in the sheet-like form at the entrance end of the assembly 10 are properly oriented relative to the dispersed image light at image plane 30, same will conduct this received light to the exit end $15'$ of the assembly.

The exit end portion 15 of the light-conducting components of the assembly, as already pointed out, are arranged in like geometric array. Accordingly, since relay system 16 is similar to the already-described relay system 14, the exit ends of the light-conducting components of assembly 10 will be imaged thereby at image plane 35. At the same time, the various wavelengths of light transmitted through the components will be similarly dispersed by prism means 26.

Thus, when the relay system 16 is properly oriented as to its dispersion relative to the sheet-like layer of light-conducting components at exit end 15, so that the dispersion of the prism and the sheet-like layer of components are properly at right angles to each other, a two-dimensional image, such as shown by vertical arrow B"A"C" and horizontal arrow D"A"E", will be formed and this image will be of good optical quality and good definition notwithstanding the fact that the transmitted patterns will be formed against a background of spectral colors.

While prism means 20 and prism means 26 have been mentioned as the light-dispersing means for the first and the second light-relaying systems 14 and 16, respectively, it should be noted that either or both of these means could be replaced, if desired, by other light-dispersing means such as a diffraction grating or the like.

Having described my invention, I claim:

1. An image-transmitting optical system comprising a first light-relaying system, a fiber optical assembly, and a second light-relaying system disposed in optical alignment, said fiber optical assembly comprising a relatively large number of similar thin elongated light-conducting components having their respective opposite end portions arranged in adjacent side-by-side substantially parallel relation to one another so as to form at each end of said assembly a flat sheet-like layer of appreciable width, and with the individual components at some opposite ends disposed in like geometrical array, each component comprising a core of transparent material having a predetermined refractive index and cladding of transparent material of a lower refractive index surrounding said core throughout the same length thereof, all of said components at each end of said assembly having optically finished end surfaces disposed in a common transverse plane, said first light-relaying system comprising lens means for forming an image of an object a polychromically illuminated object plane of said optical system substantially at the transverse plane of the entrance end of said assembly and light-dispersing means arranged to disperse the component wavelengths of the light rays forming said image into a spectrum of colors in a transverse direction substantially at right angles relative to the width direction of said sheet-like layer at said entrance end, said second light-relaying system comprising lens means focused upon the transverse plane of the exit end of said assembly and arranged to form an image thereof substantially at a final image plane of said optical system and light-dispersing means arranged substantially at right angles relative to the width direction of said sheet-like layer at said exit end so as to disperse the light rays transmitted by said fiber optical components into their component wavelengths at said final image plane, whereby a two-dimensional image of said object at said object plane against a background of spectral color will be formed at the final image plane of said optical system.

References Cited

UNITED STATES PATENTS

| | | | |
|---|---|---|---|
| 3,191,487 | 6/1965 | Kruythoff et al. | 350—96 X |
| 3,256,767 | 6/1966 | Bousky. | |

JOHN K. CORBIN, Primary Examiner

U.S. Cl. X.R.

350—168